Patented Feb. 9, 1926.

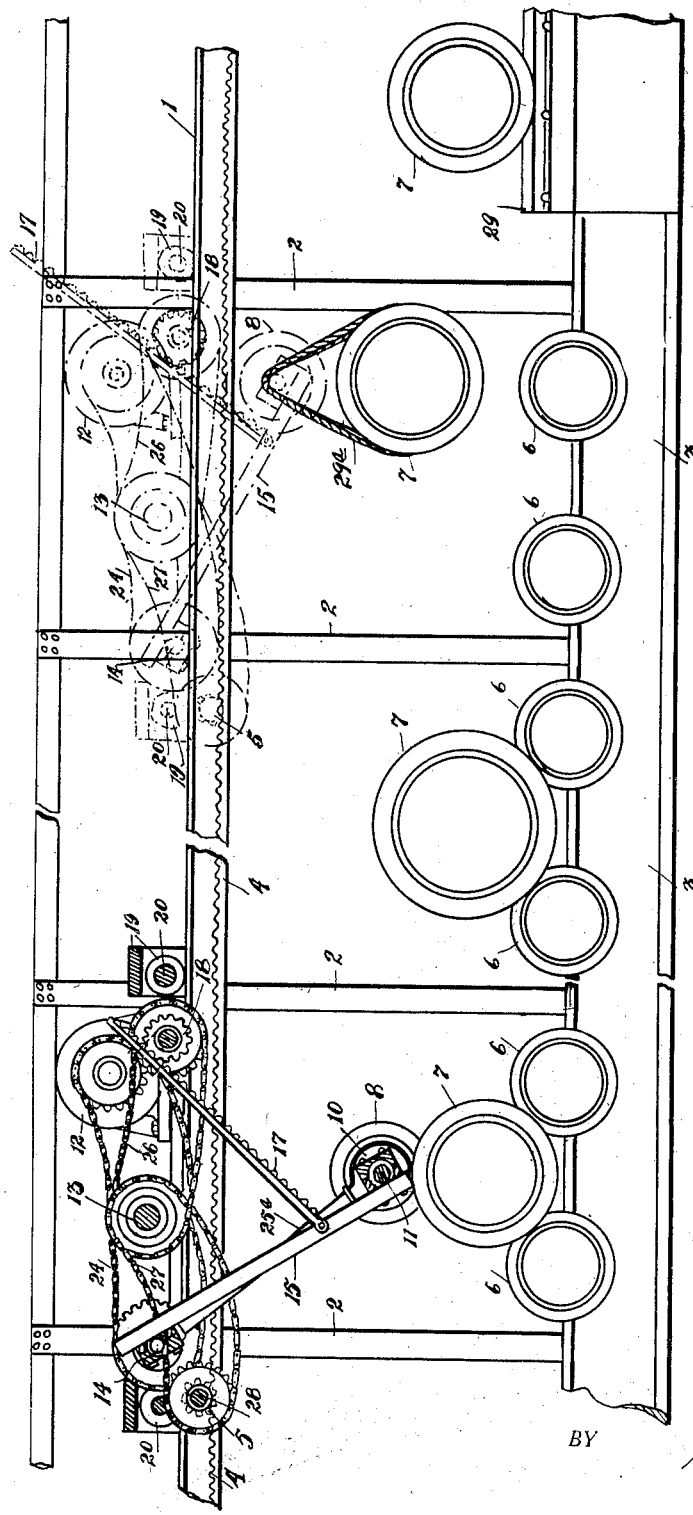

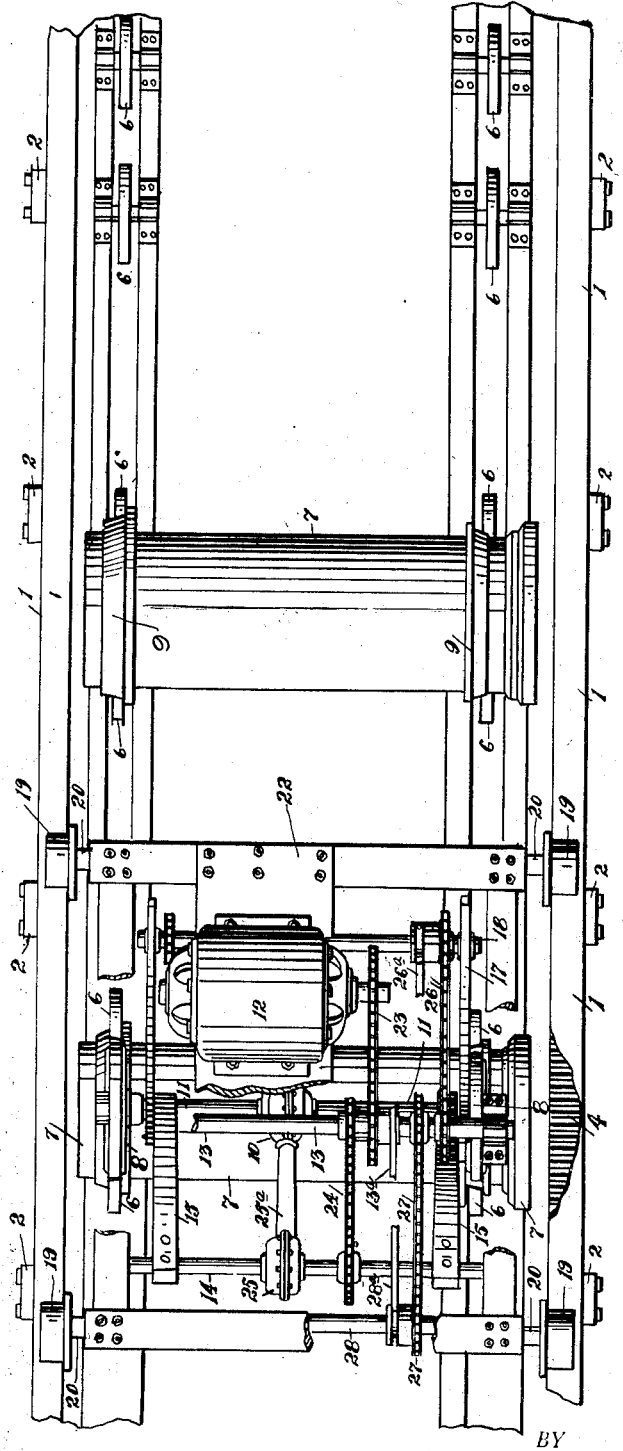

1,572,445

UNITED STATES PATENT OFFICE.

CLIFFORD R. NICHOLS, OF DALLAS, TEXAS.

PORTABLE PLASTIC-WARE-MAKING MACHINE.

Application filed April 20, 1925. Serial No. 24,627.

*To all whom it may concern:*

Be it known that I, CLIFFORD R. NICHOLS, a citizen of the United States, residing at Dallas, in the county of Dallas and State of Texas, have invented certain new and useful Improvements in Portable Plastic-Ware-Making Machines, of which the following is a specification.

This invention relates to the manufacturing process used in the forming of articles and bodies from plastic and cementitious materials, both re-inforced and non-re-inforced, in a rotatable mold, and it refers more particularly to a combined mold rotating, hoisting and transporting apparatus to be uesd in such manufacture, the primary object being to provide an improved machine whereby to accomplish the results obtainable through separately maintained agencies, and to thus greatly expedite the manufacturing of products of this nature and to materially reduce the expense incident thereto.

The invention further aims to provide a mechanism in combination to effect the desired rotation of the forms or molds used in the process, having variable speeds controllable at the will of the operator and which may be readily transported to an adjacent mold supporting mechanism to effect rotation of a mold thereon, thus eliminating the obvious cost and maintenance of a separate rotating mechanism.

A further object of the invention contemplates in combination with the foregoing structure, to perfect an arrangement whereby to remove the formed article from the mold support and to transport the same to a convenient point for disposal and to place on the mold rotating mechanism empty molds preparatory to further operations.

Still further, the invention embodies a rotating mechanism which may be applied to the upper arc of a forming mold at any point thereon providing the most desirable results and may be restricted to such position until the product is formed.

With these and other objects in view, the invention further consists of the novel mechanism illustrated in the accompanying drawings and manifested in the course of the following detail description of an apparatus embodying the invention.

Figure 1 represents an elevational view of an apparatus constructed in accordance with the present invention.

Figure 2 represents a plan view of the invention, illustrating the position of the driving mechanism therefor.

In proceeding in accordance with the present invention, 1 denotes an elevated trackway, composed preferably of oppositely disposed channel members supported by uprights 2—2, disposed in a base portion 3, illustrated in Figure 1. A gear rack 4 is mounted on a lateral flange of each of the channel members 1 the full length thereof, which permits of engagement of the driving gears 5—5, enabling the structure, later described, to be transported along the trackway.

Upon the base structure 3, beneath the trackway 1, and at right angles thereto is mounted a multiplicity of spaced idle rollers 6—6. These rollers are situated to admit a mold or form 7 therebetween and upon which the latter is rotated and these units are disposed at a convenient point from the trackway 1 to permit of ready engagement of the rotating mechanism of the structure composed primarily of wheels 8—8, which are adapted to frictionally contact with the runner rims 9 of the forms or molds.

Rotation of the wheels 8—8 is accomplished through the drive shaft and gear set 10, mounted upon the axle 11, as in Figure 2, driving power therefor being transmitted from the motor 12 to the jack shaft 13 thence to the shaft 14, either by chain drive or friction, as is found most practicable in application. The structure also serves as a means for holding the mold in position upon the idler rollers 6.

The jack shaft 13, it will be observed, furnishes a substantial mounting for the driving assembly of the entire structure, thereby confining such mechanism in a conservative space and affording a simple and practical clutch mechanism which permits of additional driving assembly; should the same be required.

Also mounted upon the shaft 14, is a hoisting mechanism composed of a pair of oppositely arranged arms 15, which have their lower ends bolted to the axle 11 of the rotating element, the shaft 14 merely furnishing a pivotal point for the arms 15 when employed in hoisting.

Intermedate the ends of the arms 15 is pivoted a ratchet bar 17, which is extended upwardly where its teeth engage those of a gear wheel 18. The gear 18 is rotated also off the jack shaft 13, whereupon, through the ratchet bar 17, the arms are lifted, thus, elevating the driving wheels 8—8 from engagement with the runner rims of the forms.

Referring now to Figure 2 of the drawings, the weight of the movable structure is supported upon the flat surface wheels 19, freely mounted upon the shafts 20, and which are driven along the trackway 1 by the gears 5, mounted upon the shaft 28, as hereinbefore pointed out. This arrangement is effected to prevent injury to the rack bar 4 by excessive weight and vibration.

To further illustrate the driving mechanism, the motor 12, mounted upon the support 22, drives the shaft 13 through the chain engagement 23. For applying rotation to the molds 7 therebeneath, power is transmitted from the shaft 13 to the shaft 14 through the drive 24, which in turn imparts rotation to the differential gearing 10 through bevel gear 25 and shaft $25^a$, thence to the wheels 8, frictionally engaging the upper arc of the forming mold 7.

The mechanism, being brought out of frictional engagement with the form 7 by the drive 26, from the shaft 13, and the ratchet bar 17, motor power is then shifted to the drive 27, which revolves the shaft 28, and in turn actuates the gears 5—5 on the ends thereof, shown in Figure 1, to transport the mechanism.

The clutch controlling mechanism is composed of the usual shifting levers wherein the lever $28^a$ mounted on shaft 28 is arranged to engage and disengage the propelling mechanism of the structure where it engages the gear rack 4. The lever $13^a$ mounted upon the jack shaft 13 functions to effect the rotating mechanism through the gear mechanism 25, shaft $25^a$, and the differential 10, and the hoisting structure is controlled by the shifting lever $26^a$.

Returning to Figure 1, the position of the structure suggested by the broken lines, denotes the manner by which the molded articles are conveyed to the rails 29, for disposal and method of placing any empty mold upon the idlers 6—6 for further production.

In operation, the operator may be mounted upon the movable structure in order that the controlling mechanism may be more readily accessible. The crane, as it may be suitably termed, is carried along the trackway 1, upon the wheels 19 until it is directly over the form on the idling rollers 6—6. Power from the motor 12 is then shifted to the drive 26, in Figure 2, whereby to actuate the gear rack 17 to lower the arms 15, carrying the friction wheels 8—8, the power is then transferred to rotating mechanism through the drive 24, and bevel gear 25, through differential 10, whereby the wheels 8 are revolved at a high rate of speed against the form, causing the latter to spin, and into which concrete, mortar, cement or other cementitious agglomerates is deposited. After sufficient wall thickness of the product is acquired by mechanism, not shown, the power from the motor is then again transferred to elevate the spinning or rotating mechanism, a cable or line $29^a$ is placed about the mold and the latter is conveyed to the rails 29 for disposal.

The invention has been disclosed as embodying the structure as set forth in the appended claims and it should be understood that it is not desired that the same be limited to the specific disclosure as herein set forth and that minor changes and modifications, such as the substitution of positive drive for friction and vice versa and other like changes, may be made as fall within the scope of said claims.

1. In a centrifugal plastic ware making machine, a multiplicity of spaced rotatable molds; rotary members supporting the molds; portable driving means for the molds including rotary driving members arranged to frictionally engage the upper arcs of the molds and exerting downward pressure thereon so as to positively hold the molds from upward movement; means for hoisting the molds by the said rotary driving means after completion of the product, and means for transporting the machine from the point of operation to dispose of the finished product.

2. In a centrifugal plastic ware making machine, a multiplicity of spaced rotary molds; rotary members supporting the molds; portable driving means for the molds including rotary driving members arranged to frictionally engage the upper arcs of the molds and exerting downward pressure thereupon so as to positively hold the molds against upward movement, and means for removing and disposing of the molds from said rotating mold supporting members by the power used to rotate the same.

3. In a portable plastic ware making apparatus in combination with a plurality of molds and spaced mold rotating supports; means depending from said apparatus arranged to frictionally engage and rotate said molds, and means in combination with said rotating means to elevate said molds and convey the same to a point of disposal.

4. In a portable plastic ware making machine in combination with a series of molds and mold rotating supports; means for propelling said apparatus to enable the same to communicate with the respective molds; means depending from said machine to frictionally contact with and spin the molds, and means in combination with said propelling and spinning means to raise the mold and dispose of the same.

5. In a portable plastic ware making machine in combination with a plurality of spaced rotating idler wheels; removable molds mounted on said wheels; means upon said machine to frictionally contact with and rotate said mold; means for lifting said mold by said rotating means, and means for transporting said machine to co-act accordingly with adjacent molds.

6. In a portable machine for making hollow ware in combination with a plurality of molds and mold rotating supports; a suspended trackway for said machine; means for propelling said machine along said trackway independently of said molds and mold supporting mechanism; means depending from said machine to frictionally contact with the upper arcs of the molds to rotate the latter, and means in combination with said propelling means and rotating means to remove the mold from its support and convey the same to a point for disposal.

7. In a machine for the manufacture of hollow ware in combination with a series of alined molds and mold rotating supports; an elongated trackway for said machine upon which the latter is arranged to be propelled; means depending from said machine to frictionally engage and rotate the mold upon its support; means for governing the speed of such rotation, and means combined with said rotating means to remove the finished product and replace the same with an empty mold.

8. In a machine for the manufacture of hollow products having a suspended mounting whereon the machine is arranged to be transported; a series of alined molds and mold rotating units therebeneath, independent of said machine and mounting; means extending from said machine to frictionally engage with and revolve either of said molds and to positively prevent upward movement thereof; means in combination with said latter means to elevate the mold from its rotating unit and convey the same to a point for disposal.

9. In a machine for casting hollow products combined with a plurality of rotatable molds, including rotating, hoisting and carrying means for said molds; a transporting means for said machine; a traction means, a power and power transmission means; a means for securing said portable machine in a fixed position by rendering inoperative said transporting means.

10. In a machine for casting hollow products in combination with rotatable molds, including rotating, hoisting and carrying means for said molds; a transporting means for said machine; a traction means, a power and power transmission means, and means for retaining said machine in a fixed position for permitting frictional contact of said rotating means with said mold.

11. A transportable machine for the manufacture of hollow products over a plurality of fixed mold rotating units having removable molds thereon; a power transmission means carried by said machine to engage the upper arcs of said molds; means for driving said power transmission means to rotate the respective mold; means for removing the mold by the said transmission means, and means for conveying the mold to a distant point upon movement of the machine.

12. The combination in a pipe making and lining machine of a combined transporting, rotating and hoisting mechanism; driving means for said transporting mechanism; means for shifting said driving means to affect said rotating mechanism; means to shift said latter driving means to said hoisting mechanism to raise the rotated article whereby to remove the same from its support.

13. The combination in a pipe making and lining machine mounted above a multiplicity of mold supporting units; means in suspension from said machine to frictionally engage the upper arc of a mold supported by said units; means to actuate said suspended means to impart rotation to said mold, and means co-operating with said suspended means to remove and dispose of said mold when the operation is concluded.

14. The combination in a pipe making and lining machine of an apparatus movably suspended above a plurality of stationary form rotating units; means to frictionally hold and rotate the forms disposed upon said rotating units from said machine, and means to engage, lift and carry said forms from said rotating units when said machine is moved.

15. The combination in a pipe making and lining machine of an apparatus transportably mounted upon a suspended mounting above a plurality of rotatable supports having forms removably disposed thereon; means to frictionally hold and rotate the forms by the machine, and means to remove the forms by the said holding and rotating means.

16. In a machine for manufacturing hollow articles of plastic materials, a series of rotatable molds, means to support the molds and portable driving means movable from one mold to another and adapted to frictionally engage the upper arcs of the respective molds and impart rotation thereto and simultaneously hold the molds against upward movement during rotation of the latter.

In testimony whereof I affix my signature.

CLIFFORD R. NICHOLS.